United States Patent [19]

Tomohisa et al.

[11] Patent Number: 4,660,082
[45] Date of Patent: Apr. 21, 1987

[54] OUTPUT CORRECTION IN IMAGE REPRODUCTION

[75] Inventors: Kunio Tomohisa; Masamichi Cho, both of Kyoto, Japan

[73] Assignee: Dainippon Screen Mfg. Co., Ltd., Kyoto, Japan

[21] Appl. No.: 746,621

[22] Filed: Jun. 19, 1985

[30] Foreign Application Priority Data

Aug. 24, 1984 [JP] Japan .................... 59-175885

[51] Int. Cl.$^4$ .................. H04N 5/14; H04N 1/40
[52] U.S. Cl. .................... 358/163; 358/213; 358/280; 358/284
[58] Field of Search ............ 358/163, 212, 213, 280, 358/284

[56] References Cited

U.S. PATENT DOCUMENTS

| 3,800,079 | 3/1974 | McNeil et al. ............... 358/213 |
| 4,216,503 | 8/1980 | Wiggins ........................ 358/280 |
| 4,314,281 | 2/1982 | Wiggens et al. ............... 358/280 |
| 4,571,573 | 2/1986 | Tadauchi et al. .............. 358/280 |
| 4,589,034 | 5/1986 | Yokomizo ...................... 358/284 |

FOREIGN PATENT DOCUMENTS 1526801 10/1978 United Kingdom .

Primary Examiner—James J. Groody
Assistant Examiner—Michael D. Parker
Attorney, Agent, or Firm—Lowe Price Leblanc Becker & Shur

[57] ABSTRACT

Calibration and shading correction of output image data of a photosensor array are carried out simultaneously by varying the gain and offset value of a photosensor amplifier in synchronism with input scanning of an original. The variation of gain and offset is made as a function of a first density reference voltage obtained by scanning a first density reference board, a second density reference voltage obtained by scanning a second density reference board and ideal voltages corresponding to the first and the second density reference voltages.

29 Claims, 10 Drawing Figures

OUTPUT CORRECTION IN IMAGE REPRODUCTION

FIELD OF THE INVENTION

The present invention relates to a method of and apparatus for correcting an output of an image scanner in an electronic image reproduction system, and more particularly to such correction methods and apparatus for carrying out calibration and shading correction simultaneously.

BACKGROUND OF THE INVENTION

In carrying out input scanning using a photosensor array (for instance, a CCD photosensor array or an array of photodiodes), voltage drift in the photosensor array output caused by characteristic variations in each sensor element thereof ("calibration") must be corrected.

On the other hand, when an array of photodiodes is used as a device for analyzing a laser beam modulated with the image of an original by a swinging galvano mirror or a revolving polygon mirror, the quantity of the laser beam captured by each element of the photosensor array is statically unequal. This is due to variations in the velocity of the laser beam, aberrations in the lens employed and fluctuations in the laser beam itself. Also, in scanning an original by projecting the image thereof on a CCD photosensor array, the lenses or light sources employed create errors in the amount of light transmitted, which must be corrected (this is called "shading correction").

Calibration and shading correction have conventionally been carried out by storing data for correcting a distortion factor of each element of a photosensor array, and then carrying out a corrective computation for image data obtained by the photosensor array using corresponding correction data. In this connection, Japanese Patent Laid Open No. 57-119565 discloses a method in which correction values corresponding to all the elements of a photosensor array are prestored in a memory. Japanese Patent Laid Open No. 58-145273 discloses a method by which gain correction data corresponding to all the elements of a photosensor array are prestored in a memory, and Japanese Patent Laid Open No. 58-19187 discloses a method in which the inverse values of correction values instead of the correction values themselves are prestored in a memory to provide a simple correction work. However, in each of the above methods, some correction data must be obtained; this is troublesome, and moreover, as regards the last mentioned reference, inverse correction is not precise.

In addition, there is disclosed in Japanese Patent Laid Open No. 58-27466 a method in which correction values corresponding to particular readout positions of a photosensor array are stored. Values read from the other positions of the array are obtained through interpolation, requiring circuitry and programming.

Japanese Patent Laid Open No. 58-131862 discloses a method in which an input scanning laser beam is modulated by data obtained from a light quantity detection sensor provided beside a photosensor array to maintain the incidence light quantity of the laser beam on the photosensor array constant. Because this method necessitates a light quantity detection sensor which is required to monitor all the scanning points as equally as possible, the method is impractical. U.S. patent application Ser. No. 671,984 assigned to the assignee of this invention discloses a method in which a shading phenomenon is corrected by multiplying image data obtained by a photosensor, by a correction signal output from a low-pass filter of a phase lock loop circuit in conformity with the variation of the velocity of a scanning beam on an original. This method is also effective in compensating for a shading phenomenon but it cannot carry out calibration simultaneously.

SUMMARY OF THE INVENTION

Accordingly, it is an object of the present invention to provide an improved method and apparatus for correcting output image data of a photosensor array in an electronic image reproduction system.

Another object of the present invention is to provide simultaneous calibration and shading correction on output image data of a photosensor array in an electronic image reproduction system.

A further object of the present invention is to provide calibration and shading correction in real time without prestoring correction data in an electronic image reproduction system.

A further object of the present invention is to provide a method of and apparatus for establishing high-light level and shadow level as well as calibration and shading correction in electronic image reproduction.

To satisfy the above objects, the gain and offset values of an output amplifier of a photosensor array are controlled according to the following manner.

First, two density reference boards of distinct densities are separately scanned by a photosensor array to store serially in two individual memories corresponding density reference voltages $\widetilde{V_1}$ and $\widetilde{V_2}$ respectively obtained by one element or one element block of the photosensor array.

Second, in an actual scanning of an original, the gain and offset values $V_Y$ and $V_X$ of the output amplifier are computed using the two density reference voltages $\widetilde{V_1}$ and $\widetilde{V_2}$ and corresponding ideal voltages $V_1$ and $V_2$ according to equations:

$$V_Y = (V_1 - V_2)(\widetilde{V_1} - \widetilde{V_2})$$

and $$V_X = (V_1 \cdot \widetilde{V_2} - V_2 \cdot \widetilde{V_1})/(V_1 - V_2).$$

In this connection, one of the density reference voltages is preferably obtained by scanning a white reference board (corresponding to 0% halftone dot density), and the other density reference voltage is preferably obtained by scanning a black reference board (corresponding to 100% halftone dot density). The ideal voltage $V_2$ corresponding to the black reference board can be set at 0 V, and the above-indicated equations can be expressed as:

$$V_Y = V_{max}/(\widetilde{V}_{max} - \widetilde{V}_{min})$$

and $$V_X = \widetilde{V}_{min}$$

wherein
$\widetilde{V}_{max}$ is a white reference voltage,
$\widetilde{V}_{min}$ is a black reference voltage, and
$V_{max}$ is an ideal white voltage.

Since the voltage $V_{max}$ can be treated as a constant, processing circuitry is of simple construction.

Furthermore upon taking a highlight voltage $V_H$ and a shadow voltage $V_S$ into account, corresponding gain and offset values $V_{Y3}$ and $V_{X3}$ of the output amplifier can be expressed as:

$$V_{Y3} = \frac{V_1 - V_2}{\left(\tilde{V}_1 - (\tilde{V}_1 - \tilde{V}_2)\cdot\frac{V_1 - V_H}{V_1 - V_2}\right) - \left(\tilde{V}_1 - (\tilde{V}_1 - \tilde{V}_2)\cdot\frac{V_1 - V_S}{V_1 - V_2}\right)}$$

$$V_{X3} = \frac{1}{V_1 - V_2}\left[V_1\cdot\left\{\tilde{V}_1 - (\tilde{V}_1 - \tilde{V}_2)\cdot\frac{V_1 - V_S}{V_1 - V_2}\right\} - V_2\cdot\left\{\tilde{V}_1 - (\tilde{V}_1 - \tilde{V}_2)\cdot\frac{V_1 - V_H}{V_1 - V_2}\right\}\right]$$

Therefore, by providing a circuit for carrying out the above computation, highlight voltage and shadow voltage can be established together.

It is noted incidentally that the two density reference voltages are preferably obtained by scanning the corresponding density reference boards with the gain and offset values of the output amplifier at "1" and "0" respectively, whereby no special circuitry for obtaining density reference voltage is necessary.

The above and other objects and features of this invention can be appreciated more fully from the following detailed description when read with reference to the accompanying drawings.

DETAILED DESCRIPTION OF A PREFERRED EMBODIMENT OF THE INVENTION

Figure 7:
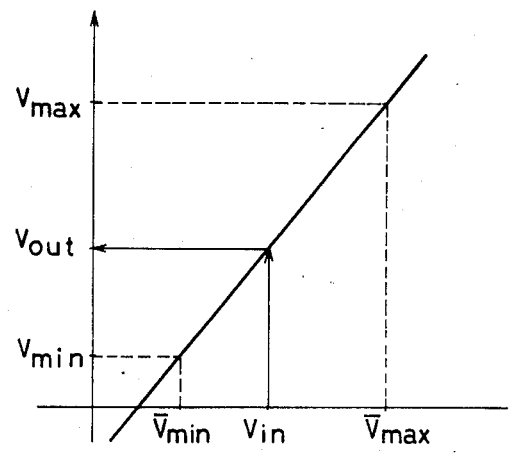
FIG. 7 is a graph of a relation among several input voltages and corresponding output voltages in accordance with the invention.

The present invention is put into practice principally with use of density signals obtained by scanning two density reference boards of distinct densities (ordinarily a white reference board and a black reference board). It is now assumed as shown in FIG. 7 that an ideal voltage corresponding to a white reference board is $V_{max}$, an ideal voltage corresponding to a black reference board is $V_{min}$, an actual white reference voltage (uncorrected) obtained by scanning a white reference board is $\tilde{V}_{max}$, and an actual black reference voltage (uncorrected) obtained by scanning a black reference board is $\tilde{V}_{min}$.

It is further assumed that an input voltage corresponding to image density obtained by scanning an original is $\tilde{V}_{in}$, and an output voltage obtained by correcting the input voltage in a manner to be described hereinafter is $V_{out}$.

Output correction in accordance with the present invention can be carried out either on an output of each element of a photosensor array or on an average of the outputs of several photosensor elements (in either case, one output is called a "unit output" hereinafter). In this regard, since a plurality of unit outputs are successively read out in either case, the succession of unit outputs of one photosensor array requires a time t, which is, of course, within a time $T_0$ necessary for scanning one scanning line.

Figure 9:
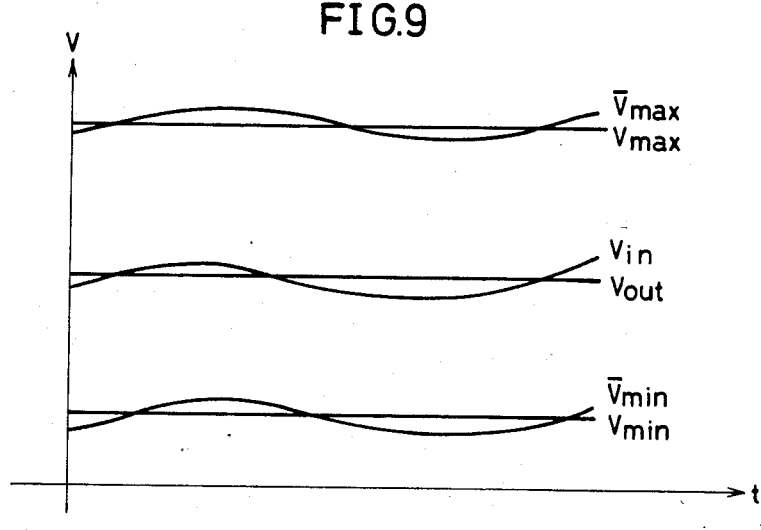
FIG. 9 is a graph of relations between uncorrected density reference voltages and corresponding ideal voltages.

FIG. 9 is a graph of a relation among a white reference voltage $\tilde{V}_{max}$, a black reference voltage $\tilde{V}_{min}$, an ideal white voltage $V_{max}$, an ideal black voltage $V_{min}$ and an input voltage $V_{in}$ obtained by scanning an original, and an output voltage $V_{out}$ obtained by correcting the input voltage. An actual input voltage $V_{in}$ between the ideal white and black voltages $V_{max}$ and $V_{min}$ can be converted to a corresponding ideal output voltage $V_{out}$ according to an equation:

$$V_{out} = \frac{(V_{max} - V_{min})}{(\tilde{V}_{max} - \tilde{V}_{min})} V_{in} - \left[\frac{(V_{max}\tilde{V}_{min} - V_{min}\tilde{V}_{max})}{(\tilde{V}_{max} - \tilde{V}_{min})}\right]. \quad (1)$$

In this regard, the actual input voltage $V_{in}$ is, in principle, between the two ideal voltages $V_{max}$ and $V_{min}$, although equation (1) is also applicable when the actual input voltage $V_{in}$ is out of the range between the actual white and the black reference voltages $\tilde{V}_{max}$ and $\tilde{V}_{min}$ provided that the amount is not too significant.

The relation between the input voltage $V_{in}$ and the output voltage $V_{out}$ of an amplifier is expressed by an equation:

$$V_{out} = V_Y(V_{in} - V_X) \quad (2)$$

wherein $V_Y$ and $V_X$ are respectively the gain and the offset value of the multiplicative amplifier.

Making the equation (1) relate to the equation (2), the gain $V_Y$ of the amplifier can be expressed as:

$$V_Y = (V_{max} - V_{min})/(\tilde{V}_{max} - \tilde{V}_{min}) \quad (3),$$

and the offset value $V_X$ of the amplifier can be expressed as:

$$V_X = (V_{max}\tilde{V}_{min} - V_{min}\tilde{V}_{max})/(V_{max} - V_{min}) \quad (4).$$

Figure 8:
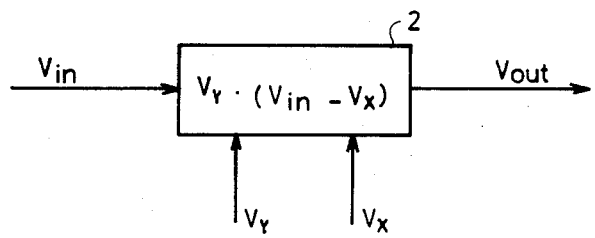
FIG. 8 is a block diagram of an output amplifier of the present invention.

Therefore, by controlling an amplifier of a construction as shown in FIG. 8, the input voltage $V_{in}$ can be converted to the ideal output voltage $V_{out}$.

It must be noted at this juncture that the gain $V_Y$ and the offset value $V_X$ of the amplifier are updated for each unit output.

Figure 1:
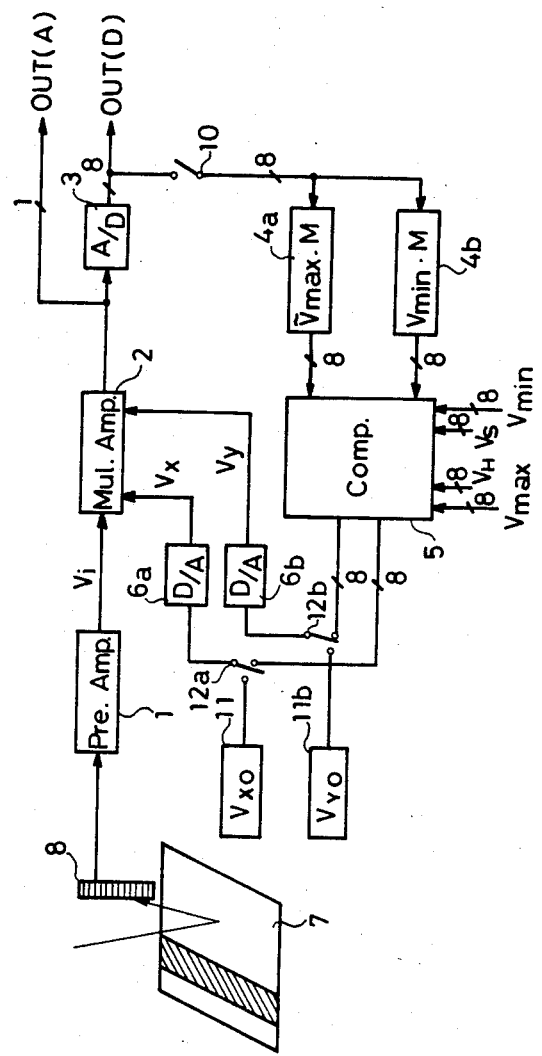
FIG. 1 is a block diagram of an embodiment of the present invention.

In FIG. 1, a reference density signal obtained by scanning a reference density board 7 by a photosensor array 8 is input via a pre-amplifier 1 to an amplifier 2. The gain $V_Y$ and the offset value $V_X$ of the amplifier 2 are made constant, as mentioned hereinafter, when white and black reference voltages are to be obtained, or made variable by the operation of computation circuitry 5 when an original is to be scanned. The output of the amplifier 2 is input via an A/D converter 3 to a subsequent processor, not shown (for instance, a color correction circuit). When the output of the amplifier 2 is processed in analog form in the subsequent stage, the A/D converter is not necessary.

In the meantime, the output of the A/D converter 3 is input via a switch 10 to memories $4_a$ and $4_b$ whose outputs are applied to the computation circuitry 5. Two outputs of the computation circuitry 5, namely, the gain $V_Y$ and the offset value $V_X$ of the amplifier 2, are input via switches $12_a$ and $12_b$ to D/A converters $6_a$ and $6_b$, respectively. The switches $12_a$ and $12_b$ respectively select the inputs to the D/A converters $6_a$ and $6_b$ from the outputs of the computation circuitry 5 and constant values $V_{X0}$ and $V_{Y0}$ stored respectively in registers $11_a$ and $11_b$. The outputs of the D/A converters $6_a$ and $6_b$ are input respectively to an offset control terminal and a gain control terminal of the amplifier 2.

A white reference voltage obtained by scanning the white reference board 7 whose density is known by the photosensor array 8 is amplified by a pre-amplifier 1, and then further amplified by the amplifier 2 with the gain $V_{Y0}$ and the offset value $V_{X0}$ thereof respectively set up at "1" and "0". The analog output of the multiplicative amplifier 2 is converted into a corresponding digital signal (for instance, of 8 bits) by the operation of the A/D converter 3, and output via a switch 10 which is switched on only when white or black reference voltages are stored into the memories $4_a$ and $4_b$. Consequently, the white reference voltage $\tilde{V}_{max}$ (uncorrected) are successively stored into the memory $4_a$.

Similarly, a black reference voltage $\tilde{V}_{min}$ obtained by scanning a black reference board 7 whose density is known by the photosensor array 8 is amplified by a preamplifier 1, and then further amplified by the amplifier 2 with gain $V_{Y0}$ and offset value $V_{X0}$ thereof respectively set up at "1" and "0". The analog output of the amplifier 2 is converted into a corresponding digital signal (for instance, of 8 bits) by the operation of the A/D converter 3, and output via the aforesaid switch 10. Consequently, the black reference voltage $V_{min}$ (uncorrected) is stored successively into the memory $4_b$. When the white and the black reference voltages are stored in the memories $4_a$ and $4_b$ respectively, the switch 10 is switched off, while the switches $12_a$ and $12_b$ are switched to conduct the outputs of the computation circuitry 5 to the D/A converters $6_a$ and $6_b$.

Using the thus-constructed circuit, image data obtained by scanning an original are processed in the following manner. Synchronized with the input image data of the first pixel of the first scanning line of an original (a first unit output) via the pre-amplifier 1 to the amplifier 2, corresponding white reference voltage $\tilde{V}_{max}$ and black reference voltage $\tilde{V}_{min}$ together with corresponding ideal white voltage $V_{max}$ and ideal black voltage $V_{min}$ stored in a storage means (not shown) are read out from the memories $4_a$ and $4_b$ to the computation circuitry 5. The computation circuitry 5 carries out computations of equations (3) and (4) using the above-mentioned voltages in real time and thereby controls the amplifier 2.

The same correction is carried out successively for image data of the next and subsequent pixels of the first scanning line and then for those pixels situated on the next and subsequent scanning lines.

Figure 2:
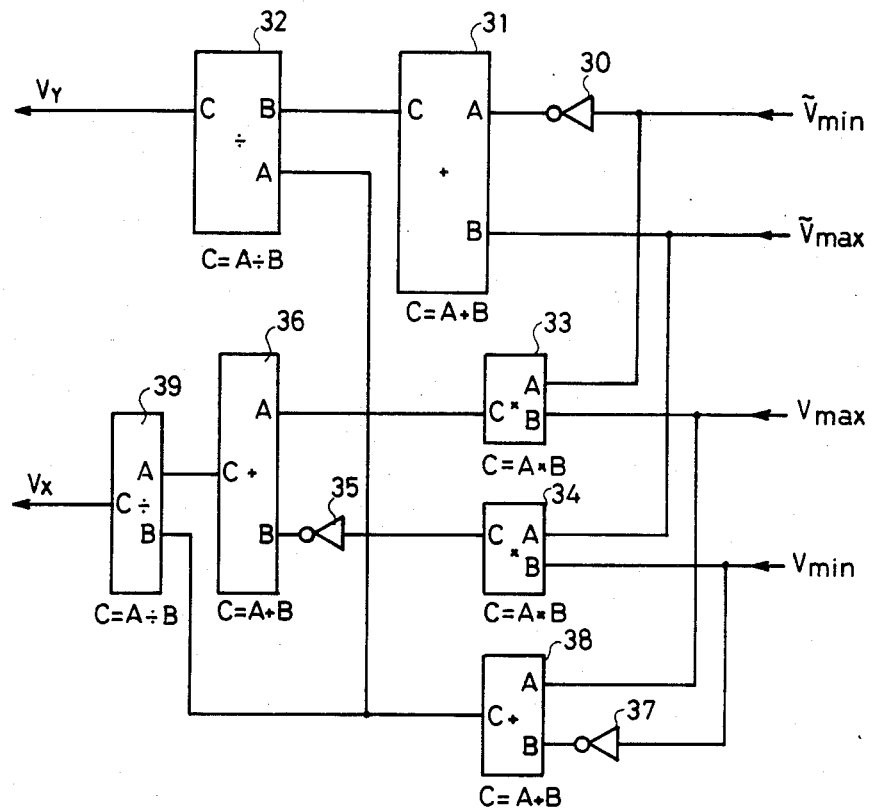
FIG. 2 is a block diagram of computation circuitry employed in the present invention.

In FIG. 2, the white reference voltage $\tilde{V}_{max}$ and an inversion of the black reference voltage $\tilde{V}_{min}$ inverted by an inverter 30 are input to an adder 31 which carries out a computation $\tilde{V}_{max} - \tilde{V}_{min}$. Meanwhile, the black reference voltage $\tilde{V}_{min}$ and the ideal white voltage $V_{max}$ are input to a multiplier 33 which carries out a computation $V_{max} \times \tilde{V}_{min}$, and the white reference voltage $\tilde{V}_{max}$ and the ideal black voltage $V_{min}$ are input to a multiplier 34 which carries out a computation $\tilde{V}_{max} \times V_{min}$. The ideal white voltage $V_{max}$ and an inversion of the ideal black voltage $V_{min}$ inverted by an inverter 37 are input to an adder 38 which carries out a computation $V_{max} - V_{min}$.

The outputs of the adders 31 and 38 are input to a divider 32 which carries out a computation $(\tilde{V}_{max} - \tilde{V}_{min})/(\tilde{V}_{max} - \tilde{V}_{min})$ to output the resultant thereof as the gain $V_Y$ of said amplifiers. The output of the multiplier 33 and an inversion of the output of the multiplier 34 inverted by an inverter 35 are input to an adder 36 which carries out a computation $V_{max} \cdot \tilde{V}_{min} - V_{min} \cdot \tilde{V}_{max}$ and outputs the resultant thereof to a divider 39. The divider 39 carries out a computation $(V_{max} \cdot \tilde{V}_{min} - V_{min} \cdot \tilde{V}_{max})/(V_{max} - V_{min})$ using the outputs of the adders 36 and 38 to output the resultant thereof as the offset value $V_X$ of said amplifiers. It should be noted incidentally that these computations can also be carried out according to an equivalent computer program using software.

When the ideal white voltage $V_{max}$ is $V_{max} = 2$ V and the ideal black voltage $V_{min}$ is $V_{min} = 0$V in equations (3) and (4), corresponding gain $V_{Y2}$ and offset values $V_{X2}$ of the amplifier 2 can be expressed as:

$$V_{Y2} = (2 - 0)/(\tilde{V}_{max} - \tilde{V}_{min}) \qquad (5)$$
$$= 2/(\tilde{V}_{max} - \tilde{V}_{min})$$

and $$V_{X2} = (V_{max} \cdot \tilde{V}_{min} - V_{min} \cdot \tilde{V}_{max})/(V_{max} - V_{min}) \qquad (6)$$
$$(2 \cdot \tilde{V}_{min} - 0 \cdot V_{max})/(2 - 0)$$
$$= \tilde{V}_{min}$$

Figure 3:
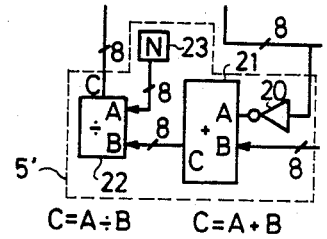
FIG. 3 is a block diagram of another embodiment of the present invention.

These equations (5) and (6) can be computed by computation circuitry 5' as shown in FIG. 3 (this apparatus and those shown in FIGS. 4, 6 mentioned hereinafter are modifications of the apparatus of FIG. 1; therefore, the equivalent components have the same numbers. In this case, an output of the memory $4_b$ itself is the offset value $V_{X2}$, while the gain $V_{Y2}$ is obtained by a combination of an inverter 20, an adder 21 (corresponding to the adder 31 shown in FIG. 2) and a divider 22 (corresponding to the divider 32) with the dividend [the numerator of the equation (5), which is 2 in this case] supplied from a register 23.

Figure 4:
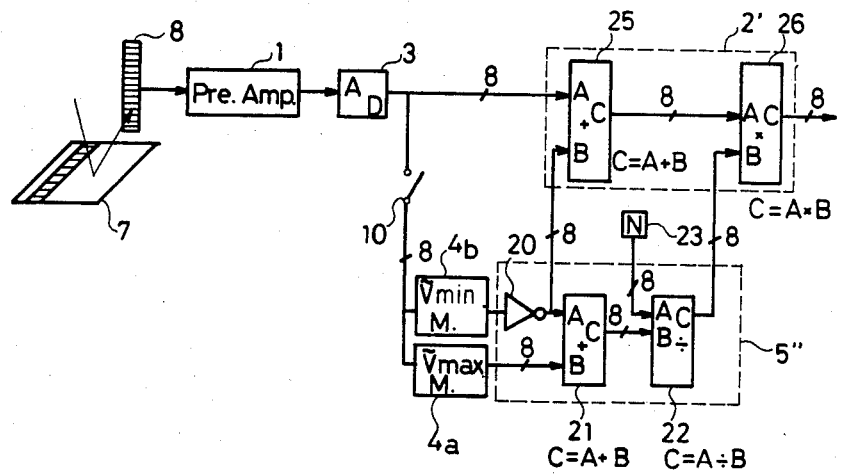
FIG. 4 is a block diagram of another embodiment of the present invention.

FIG. 4 shows another embodiment of the invention in which a digital circuit 2' is substituted for the amplifier 2 shown in FIG. 1, and the computation circuit 5 shown in FIG. 3 is employed. In FIG. 4, the output of the pre-amplifier 1 is converted into a corresponding digital signal by the operation of an A/D converter 3, then input to an adder 25 and, when required, to memories $4_a$ and $4_b$ for storing the white and the black reference voltage $V_{max}$ and $V_{min}$ via the switch 10.

There is input an inversion of the black reference voltage $\tilde{V}_{min}$, namely an offset correction value $V_X$, from the memory $4_b$ to an adder 25 which carries out computation $(V_{in} - V_X)$ expressed by the equation (2). An output of the adder 25 and an output of the divider 22, namely, gain correction value $V_Y$, are input to a multiplier 26 which carries out computation of the righthand member of the equation (2).

Figure 10:
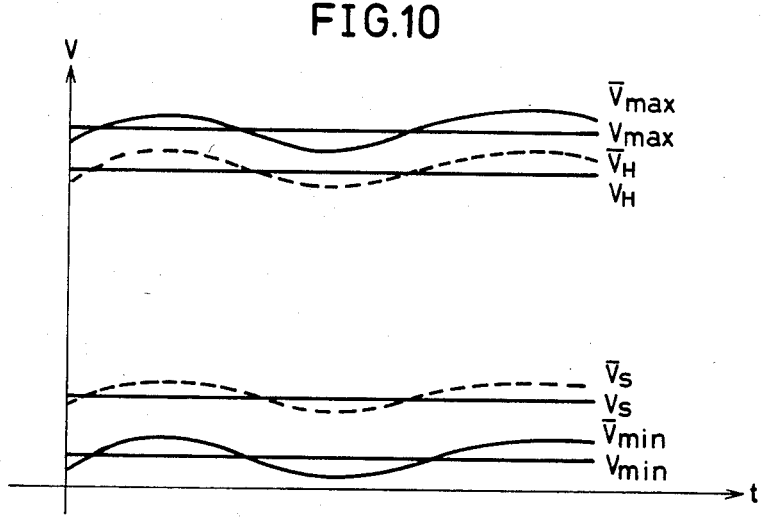
FIG. 10 is a graph of uncorrected and ideal voltages of highlight and shadow levels among those of the density reference voltages.

Within the reproductive range of an image reproducing system, there can be set up voltages corresponding to highlight and shadow density levels which are ordinarily the upper and the lower limits of the dynamic range of a corresponding circuit in the system. In this regard, a highlight voltage $\tilde{V}_H$ and a shadow voltage $\tilde{V}_S$ (uncorrected) as shown in FIG. 10 can be converted respectively to an ideal highlight voltage $V_H$ and an ideal shadow voltage $V_S$ according to equations:

$$(V_{max} - V_H)/(V_{max} - V_{min}) = (\tilde{V}_{max} - \tilde{V}_H)/(\tilde{V}_{max} - \tilde{V}_{min}), \quad (7)$$

and $$(V_{max} - V_S)/(V_{max} - V_{min}) = (\tilde{V}_{max} - \tilde{V}_S)/(\tilde{V}_{max} - \tilde{V}_{min}). \quad (8)$$

Accordingly, in order to make the input highlight and shadow voltages $\tilde{V}_H$ and $\tilde{V}_S$ correspond respectively to said ideal white and black voltages $V_{max}$ and $V_{min}$, the gain $V_{Y3}$ and the offset value $V_{X3}$ of amplifier 2 must satisfy equations:

$$V_{max} = V_{Y3}(\tilde{V}_H - V_{X3}) \quad (9)$$

and $$V_{min} = V_{Y3}(\tilde{V}_S - V_{X3}). \quad (10)$$

Making the equations (9) and (10) relate to the equations (3) and (4), the gain $V_{Y3}$ and the offset value $V_{X3}$ can be expressed as:

$$V_{X3} = (V_{max} \cdot \tilde{V}_S - V_{min} \cdot \tilde{V}_H)/(V_{max} - V_{min}) \quad (11)$$

and $$V_{Y3} = (V_{max} - V_{min})/(\tilde{V}_H - \tilde{V}_S). \quad (12)$$

Meanwhile, the highlight voltage $\tilde{V}_H$ and the shadow voltage $\tilde{V}_S$ can be, according to the equations (7) and (8), expressed as:

$$\tilde{V}_H = \tilde{V}_{max} - (\tilde{V}_{max} - \tilde{V}_{min}) \cdot (V_{max} - V_H)/(V_{max} - V_{min}) \quad (13)$$

and $$\tilde{V}_S = \tilde{V}_{max} - (\tilde{V}_{max} - \tilde{V}_{min}) \cdot (V_{max} - V_S)/(V_{max} - V_{min}). \quad (14)$$

Making the equations (13) and (14) relate to the equations (11), the gain $V_{Y3}$ and the offset value $V_{X3}$ can be expressed as:

$$V_{X3} = \frac{1}{V_{max} - V_{min}} \left[ V_{max} \cdot \left\{ \tilde{V}_{max} - (\tilde{V}_{max} - \tilde{V}_{min}) \cdot \frac{V_{max} - V_S}{V_{max} - V_{min}} \right\} - V_{min} \cdot \left\{ \tilde{V}_{max} - (\tilde{V}_{max} - \tilde{V}_{min}) \cdot \frac{V_{max} - V_H}{V_{max} - V_{min}} \right\} \right], \quad (15)$$

and $$V_{Y3} = \frac{V_{max} - V_{min}}{\left\{ \tilde{V}_{max} - (\tilde{V}_{max} - \tilde{V}_{min}) \cdot \frac{V_{max} - V_H}{V_{max} - V_{min}} \right\} - \left\{ \tilde{V}_{max} - (\tilde{V}_{max} - \tilde{V}_{min}) \cdot \frac{V_{max} - V_S}{V_{max} - V_{min}} \right\}}. \quad (16)$$

Figure 5:
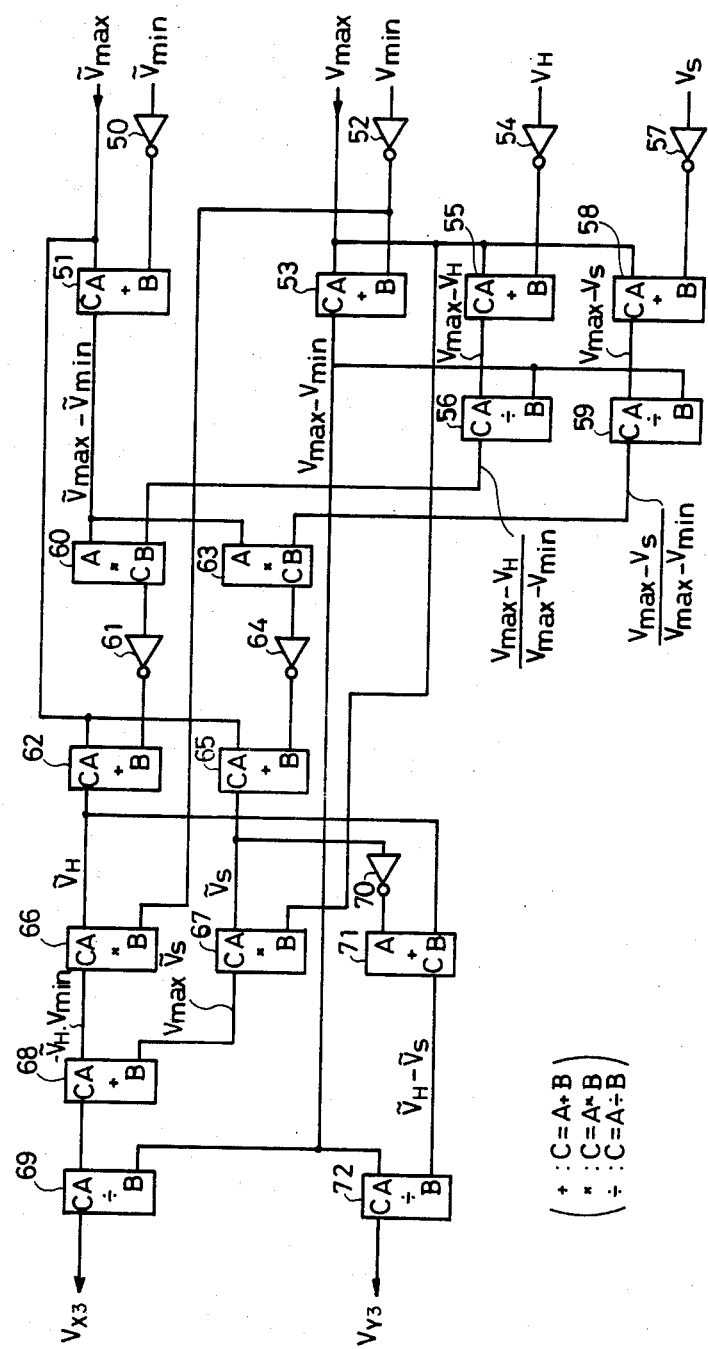
FIG. 5 is a block diagram of a computation circuitry for obtaining a gain correction value and an offset correction value.

FIG. 5 shows a block diagram of a circuit for carrying out computations of the equations (15) and (16). The white reference voltage $\tilde{V}_{max}$ and a voltage obtained by inverting the black reference voltage $\tilde{V}_{min}$ by an inverter 50 are applied to an adder 51 which carries out computation $(\tilde{V}_{max} - \tilde{V}_{min})$. Meanwhile, the ideal white voltage $V_{max}$ and a voltage obtained by inverting the ideal black voltage $V_{min}$ by an inverter 52 are applied to an adder 53 which carries out a computation $(V_{max} - V_{min})$. The ideal white voltage $V_{max}$ and a voltage obtained by inverting the ideal highlight voltage $V_H$ by an inverter 54 are input to an adder 55 which carries out a computation $(V_{max} - V_H)$. Meanwhile the ideal white voltage $V_{max}$ and a voltage obtained by inverting the ideal shadow voltage $V_S$ are input to an adder 58 which carries out a computation $(V_{max} - V_S)$. An output voltage $(V_{max} - V_H)$ of the adder 55 and an output voltage $(V_{max} - V_{min})$ of the adder 53 are input to a divider 56 which carries out a computation $(V_{max} - V_H)/(V_{max} - V_{min})$. Meanwhile an output voltage $(V_{max} - V_S)$ of the adder 58 and the output voltage $(V_{max} - V_{min})$ are input to a divider 59 which carries out a computation $(V_{max} - V_S)/(V_{max} - V_{min})$.

Then, the output voltage $(\tilde{V}_{max} - \tilde{V}_{min})$ of the adder 51 and the output voltage $(V_{max} - V_H)/(V_{max} - V_{min})$ of the divider 56 are input to a multiplier 60 which carries out a computation corresponding to the second term of the righthand member of the equation (13). Meanwhile the output voltage $(\tilde{V}_{max} - \tilde{V}_{min})$ of the adder 51 and the output voltage $(V_{max} - V_S)/(V_{max} - V_{min})$ of the divider 59 are input to a multiplier 63 which carries out a computation corresponding to the second term of the righthand member of the equation (14).

The white reference voltage $\tilde{V}_{max}$ and a voltage obtained by inverting the output of the multiplier 60 by an inverter 61 are input to an adder 62 which carries out a computation corresponding to the righthand member of the equation (13) to obtain a highlight voltage $\tilde{V}_H$. Meanwhile the white reference voltage $\tilde{V}_{max}$ and a voltage obtained by inverting the output of the multiplier 63 by an inverter 64 are input to an adder 65 which carries out a computation corresponding to the righthand member of the equation (14) to obtain a shadow voltage $\tilde{V}_S$.

The thus-obtained highlight voltage $\tilde{V}_H$ and the ideal black voltage $-V_{min}$ are input to a multiplier 66 which carries out a computation $-\tilde{V}_H \times V_{min}$. Meanwhile the shadow voltage $\tilde{V}_S$ and the ideal white voltage $V_{max}$ are input to a multiplier 67 which carries out a computation $\tilde{V}_S \times V_{max}$. Then, the output of the multipliers 67 and a voltage obtained by inverting the output of the multiplier 66 by an inverter 73 are input to an adder 68 which obtains the numerator of the right member of the equation (11). The output of the adder 68 and the output ($V_{max} - V_{min}$) of the adder 53 are input to a divider 69 which carries out a computation corresponding to the equation (11) to obtain the offset value $V_{X3}$.

In the meantime, the highlight voltage $V_H$ and a voltage obtained by inverting the shadow voltage $V_S$ by an inverter 70 are input to an adder 71 to obtain the denominator of the equation (12). The output ($V_H - V_S$) of the adder 71 and the output ($V_{max} - V_{min}$) of the adder 53 are input to a divider 72 which carries out a computation corresponding to the equation (12) to obtain the gain $V_{Y3}$.

By applying the thus-constructed computation circuitry 5 to the embodiment of FIG. 1, calibration and establishment of highlight and shadow voltages can be carried out simultaneously.

Figure 6:
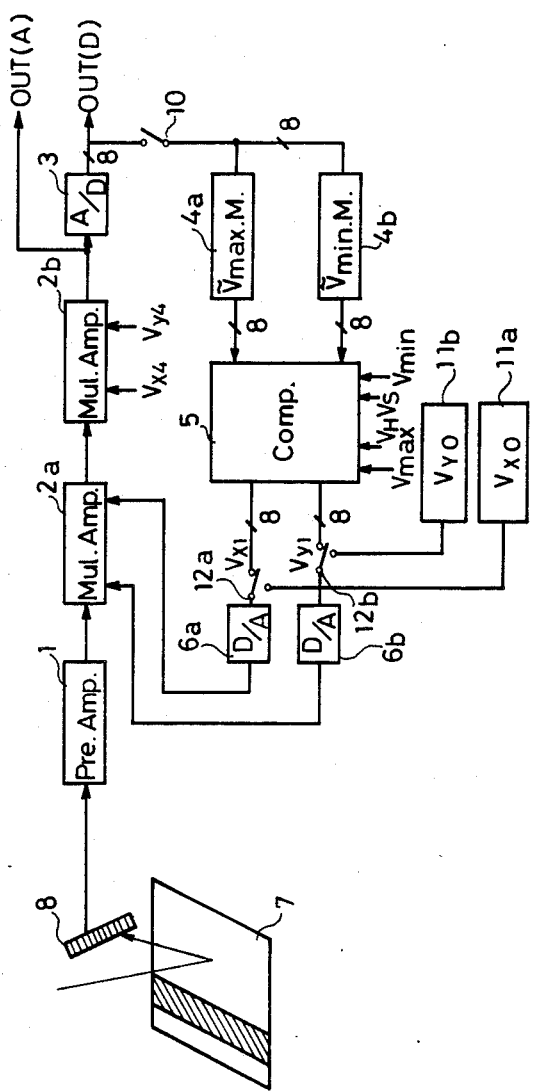
FIG. 6 is a block diagram of yet another embodiment of the present invention.

FIG. 6 shows an embodiment of the present invention in which two amplifiers $2_a$ and $2_b$ are employed to carry out calibration independently of establishing highlight and shadow voltages. In this case, the amplifier $2_a$ carries out a calibration expressed by the equations (3) and (4), while the amplifier $2_b$ carries out establishment of the highlight and shadow voltages. The gain $V_{Y4}$ and the offset value $V_{X4}$ of the amplifier $2_b$ are expressed by equations:

$$V_{X4} = (V_H + V_S)/(V_{max} - V_{min}) \quad (17)$$

and $$V_{Y4} = (V_{max} - V_{min})/(V_H - V_S) \quad (18),$$

wherein the values $V_H$, $V_S$, $V_{max}$ and $V_{min}$ are constant, and the gain $V_{Y4}$ and the offset value $V_{X4}$ are also constant. Therefore, the above-mentioned values to be supplied to the amplifier $2_b$ can be either stored in memories or digital switches.

It should be noted, incidentally, that the aforesaid white and black reference voltage data are preferably updated during each scanning process, each day or once a week by scanning the reference boards each time to compensate for possible characteristic change of the photosensor array or the lamps employed over time.

Although in the above-mentioned embodiments white and black reference boards are used to obtain white and black reference voltages, substitutes of the boards can be employed. For instance, substitutes for the white reference board can be obtained by scanning a white original under light of higher intensity, while substitutes for the black reference boards can be obtained by scanning a white original under light of lower intensity or in a black box with light off.

There can be used more than two density reference boards to carry out a more precise correction, when another computation conforming to the present invention is also required.

The method of the present invention can, of course, be applied to correcting characteristics of a plurality of photosensor arrays on the same basis. Also, a photosensor array can be composed of a plurality of photodiodes.

As mentioned above, the present invention is capable of simultaneously carrying out calibration and shading correction of the output of a photosensor array which tends to contain distortions caused by output differences between each sensor element or each element block and by the instability of optical system. Two density reference voltages are obtained by scanning corresponding reference boards without providing fixed correction data. Because the output of the photosensor array is corrected, not by data stored in a ROM, but by updated density reference data, changes in characteristics of the photosensor array or the lamps employed are easily corrected. On the other hand, the present invention is tolerant of characteristic differences between each element or each block of a photosensor array.

We claim:

1. A method of simultaneously carrying out calibration and shading correction of an output of a photosensor array in an input scanning device of an image reproducing system by adjusting gain $V_Y$ and offset $V_X$ values of an output amplifier of the array, comprising the steps of:

(a) storing, in a first memory, first density reference voltage data $\tilde{V}_1$ obtained by scanning, with the photosensor array, a first density reference board to develop the first data as sequence of outputs of photosensor element blocks, each of which is composed of at least one photosensor element;

(b) storing, in a second memory, second density reference voltage data $\tilde{V}_2$ obtained by scanning, with the photosensor array, a second density reference board to develop the second data as a sequence of outputs of photosensor element blocks each of which is composed of at least on photosensor element;

(c) scanning an original with said photosensor array; and (d) correcting the gain value $V_Y$ and the offset value $V_X$ of said amplifier for each of the outputs of the photosensor element blocks in synchronization with the step of input scanning using the corresponding density reference voltages $\tilde{V}_1$ and $\tilde{V}_2$ stored respectively in the first and the second memories and ideal voltages $V_1$ and $V_2$ corresponding respectively to the density reference voltages $\tilde{V}_1$ and $\tilde{V}_2$ according to the equations:

$$V_Y = (V_1 - V_2)/(\tilde{V}_1 - \tilde{V}_2)$$

and $$V_X = (V_1 \cdot \tilde{V}_2 - V_2 \cdot \tilde{V}_1)/(\tilde{V}_1 - \tilde{V}_2).$$

2. A method of simultaneously carrying out calibration and shading correction of an output of a photosensor array, employed as an input scanning device of an image reproducing system, by adjusting gain and offset values of an output amplifier of the array, comprising the steps of:

(a) storing in a first memory first density reference voltage data $\tilde{V}_1$ obtained by scanning, with the photosensor array, a first density reference board to develop the first data $\tilde{V}_1$ as a sequence of outputs of photosensor element blocks, each of which is composed of at least one photosensor element;

(b) storing in a second memory second density reference voltage data $\tilde{V}_2$ obtained by scanning with the photosensor array a second density reference board to develop the second data $\tilde{V}_2$ as a sequence of outputs of photosensor element blocks, each of which is composed of at least one photosensor element;

(c) establishing a highlight voltage $V_H$ and a shadow voltage $V_S$;

(d) scanning an original with said photosensor array; and (e) correcting the gain value $V_Y$ and the offset value $V_X$ of said amplifier for each of the outputs of the photosensor element blocks in synchronization with the input scanning as a function of corresponding density reference voltages $\tilde{V}_1$ and $\tilde{V}_2$ stored respectively in the first and the second memories, a first ideal voltage $V_1$ and a second ideal voltage $V_2$ respectively corresponding to the density reference voltages $\tilde{V}_1$ and $\tilde{V}_2$, and the highlight and the shadow voltages $V_H$ and $V_S$ according to equations:

$$V_Y = \frac{V_1 - V_2}{\left\{\tilde{V}_1 - (\tilde{V}_1 - \tilde{V}_2) \cdot \frac{V_1 - V_H}{V_1 - V_2}\right\} - \left\{\tilde{V}_1 - (\tilde{V}_1 - \tilde{V}_2) \cdot \frac{V_1 - V_S}{V_1 - V_2}\right\}}$$

and $$V_X = \frac{1}{V_1 - V_2}\left[V_1 \cdot \left(\tilde{V}_1 - (\tilde{V}_1 - \tilde{V}_2) \cdot \frac{V_1 - V_S}{V_1 - V_2}\right) - V_2 \cdot \left(\tilde{V}_1 - (\tilde{V}_1 - \tilde{V}_2) \cdot \frac{V_1 - V_H}{V_1 - V_2}\right)\right]$$

3. A method as recited in claim 1 in which the first density reference voltage $\tilde{V}_1$ and the second density reference voltage $\tilde{V}_2$ are obtained by respectively scanning the first density reference board and the second density reference board by the amplifier with the gain and the offset values thereof respectively set at 1 and 0.

4. A method as recited in claim 2 in which the first density reference voltage $\tilde{V}_1$ and the second density reference voltage $\tilde{V}_2$ are obtained by respectively scanning the first density reference board and the second density reference board by the amplifier with the gain and the offset values thereof respectively set at 1 and 0.

5. A method as recited in claim 1 in which the first density reference voltage $\tilde{V}_1$ is a white reference voltage $\tilde{V}_{max}$ corresponding to white (0% halftone dot density), the second density reference voltage $\tilde{V}_2$ is a black reference voltage $\tilde{V}_{min}$ corresponding to black (100% halftone dot density), the first ideal voltage $V_1$ is an ideal white voltage $V_{max}$ corresponding to white, and the second ideal voltage $V_2$ is an ideal black voltage $V_{min}$ corresponding to black.

6. A method as recited in claim 5 in which the ideal white voltage $V_{max}$ assumes a specific value $V_B$ and the ideal black voltage $V_{min}$ assumes 0, when the gain $V_Y$ and the offset value $V_X$ of the amplifier are expressed by equations:

$$V_Y = V_B/(V_{max} - V_{min})$$

and $$V_X = min.$$

7. A method as recited in claim 2 in which the first density reference voltage $\tilde{V}_1$ is a white reference voltage $\tilde{V}_{max}$ corresponding to white (0% halftone dot density), the second density reference voltage $\tilde{V}_2$ is a black reference voltage $\tilde{V}_{min}$ corresponding to black (100% halftone dot density), the first ideal voltage $V_1$ is an ideal white voltage $V_{max}$ corresponding to white, and the second ideal voltage $V_2$ is an ideal black voltage $V_{min}$ corresponding to black.

8. An apparatus for simultaneously carrying out calibration and shading correction of a photosensor array employed within an input scanning device of an image reproducing system by adjusting the gain and the offset values of an output amplifier of the array, comprising:

(a) a first memory for storing first density reference voltage data $\tilde{V}_1$ obtained by scanning, with the photosensor array, a first density reference board to develop the first data as a sequence of outputs of photosensor element blocks, each of which is composed of at least one photosensor element;

(b) a second memory for storing second reference voltage data $\tilde{V}_2$, obtained with the photosensor array, by scanning a second density reference board to develop the second data as a sequence of outputs of photosensor element blocks, each of which is composed of at least one photosensor element; and (c) computation means for computing a gain value $V_Y$ and an offset value $V_X$ of the amplifier for each of the outputs of the photosensor element blocks in synchronization with the input scanning device as a function of corresponding density reference voltages $\tilde{V}_1$ and $\tilde{V}_2$ stored, respectively, in the first and the second memories and ideal voltages $V_1$ and $V_2$ corresponding, respectively, to the density reference voltages $\tilde{V}_1$ and $\tilde{V}_2$ according to equations:

$$V_Y = (V_1 - V_2)/(\tilde{V}_1 - \tilde{V}_2)$$

and $$V_X = (V_1 \cdot \tilde{V}_2 - V_2 \cdot \tilde{V}_1)/(\tilde{V}_1 - \tilde{V}_2).$$

9. An apparatus for simultaneously carrying out calibration and shading correction of a photosensor array, employed within an input scanning device of an image reproducing system, by adjusting the gain and the offset values of an output amplifier of the array, comprising:

(a) a first memory for storing first density reference voltage data $\tilde{V}_1$ obtained by scanning a first density reference board with the photosensor array to develop the first data as a sequence of outputs of photosensor element blocks, each of which is composed of at least one photosensor element;

(b) a second memory for storing second density reference voltage data $\tilde{V}_2$ obtained by scanning a second density reference board with the photosensor array to develop the second data as a sequence of outputs of photosensor element blocks, each of which is composed of at least one photosensor element; and (c) computation means for computing a gain value $V_Y$ and an offset value $V_X$ of the amplifier for each of the outputs of the photosensor element blocks in synchronization with the input scanning device as a function of corresponding density reference voltages $\tilde{V}_1$ and $\tilde{V}_2$ stored, respectively, in the first and the second memories, a first ideal voltage $V_1$ and a second ideal voltage $V_2$ corresponding, respectively, to the density reference voltages $\tilde{V}_1$ and $\tilde{V}_2$, and highlight and shadow voltages $V_H$ and $V_S$ according to equations:

$$V_Y = \frac{(V_1 - V_2)}{\left\{ \tilde{V}_1 - (\tilde{V}_1 - \tilde{V}_2) \cdot \frac{(V_1 - V_H)}{V_1 - V_2} \right\} - \left\{ \tilde{V}_1 - (\tilde{V}_1 - \tilde{V}_2) \cdot \frac{(V_1 - V_S)}{(V_1 - V_2)} \right\}}$$

and $$V_X = \frac{1}{(V_1 - V_2)} \left[ V_1 \cdot \left( \tilde{V}_1 - (\tilde{V}_1 - \tilde{V}_2) \cdot \frac{(V_1 - V_S)}{(V_1 - V_2)} \right) - V_2 \cdot \left( \tilde{V}_1 - (\tilde{V}_1 - \tilde{V}_2) \cdot \frac{(V_1 - V_H)}{(V_1 - V_2)} \right) \right].$$

10. An apparatus as recited in claim 8 in which the amplifier comprises an initial voltage setup means for setting up the gain and the offset values thereof respectively at 1 and 0.

11. An apparatus as recited in claim 9 in which the amplifier comprises an initial voltage setup means for setting up the gain and the offset values thereof respectively at 1 and 0.

12. An apparatus as recited in claim 8 in which the computation means includes a gain computing means which comprises:
   (a) a first subtraction means for subtracting the second density reference voltage $V_2$ from the first density reference voltage $V_1$;
   (b) a second subtraction means for subtracting the second ideal voltage $V_2$ from the first ideal voltage $V_1$; and
   (c) a divider for dividing the output of the second subtraction means by the output of the first.

13. An apparatus as recited in claim 8 in which the computation means includes an offset computing means which comprises:
   (a) a first multiplication means for multiplying the first ideal voltage $V_1$ by the second density reference $\tilde{V}_2$;
   (b) a second multiplication means for multiplying the second ideal voltage $V_2$ by the first density reference voltage $\tilde{V}_1$;
   (c) a first subtraction means for subtracting the output $V_2 \cdot \tilde{V}_1$ of the second multiplication means from the output $V_1 \cdot \tilde{V}_2$ of the first multiplication means;
   (d) a second subtraction means for subtracting the second ideal voltage $V_2$ from the first ideal voltage $V_1$; and
   (e) a division means for dividing the output of the first subtraction means by the output of the second subtraction means.

14. An apparatus as recited in claim 12 in which each of the subtraction means comprises:
   (a) an inverter for inverting a voltage corresponding to the subtrahend of an equation input thereof; and
   (b) an adder for adding a voltage corresponding to the minuend of said equation to the output of said inverter.

15. An apparatus as recited in claim 13 in which each of the subtraction means comprises:
   (a) an inverter for inverting a voltage corresponding to the subtrahend of an equation input thereto; and
   (b) an adder for adding a voltage corresponding to the minuend of said equation to the output of said inverter.

16. An apparatus as recited in claim 8 including D/A converter means, and in which the amplifier is an analog amplifier, and outputs of the gain computation circuit and the offset computation circuit are input to the amplifier through the D/A converter means.

17. An apparatus as recited in claim 9 including a D/A converter means, and in which the amplifier is an analog amplifier, and outputs of the gain computation circuit and the offset computation circuit are input to the amplifier through the D/A converter means.

18. An apparatus as recited in claim 8 in which the amplifier is a digital amplifier comprising a subtraction means for subtracting the offset voltage from an input voltage; and a multiplier for multiplying the output of the subtraction means by the gain obtained by the computation means.

19. An apparatus as recited in claim 9 in which the amplifier is a digital amplifier comprising a subtraction means for subtracting the offset voltage from an input voltage; and a multiplier for multiplying the output of the subtraction means by the gain obtained by the computation means.

20. An apparatus as recited in claim 9 in which means in said computation means for computing the gain $V_Y$ comprises:
   (a) a first subtraction means for subtracting the second density reference voltage $\hat{V}_2$ from the first density reference voltage $\hat{V}_1$;
   (b) a second subtraction means for subtracting the second ideal voltage $V_2$ from the first ideal voltage $V_1$;
   (c) a third subtraction means for subtracting the highlight voltage $V_H$ from the first ideal voltage $V_1$;
   (d) a fourth subtraction means for subtracting the shadow voltage $V_S$ from the first ideal voltage $V_1$;
   (e) a first division means for dividing the output of the third subtraction means by the output of the second subtraction means;
   (f) a second division means for dividing the output of the fourth subtraction means by the output of the second subtraction means;
   (g) a first multiplication means for multiplying the output of the first subtraction means by the output of the first division means;
   (h) a second multiplication means for multiplying the output of the first subtraction means by the output of the second division means;
   (i) a fifth subtraction means for subtracting the output of the first multiplication means from the output of the first density reference voltage $V_1$;
   (j) a sixth subtraction means for subtracting the output of the second multiplication means from the first density reference voltage $\tilde{V}_1$;
   (k) a seventh subtraction means for subtracting the output of the sixth subtraction means from the output of the fifth subtraction means; and
   (l) a third division means for dividing the output of the second subtraction means by the output of the seventh subtraction means.

21. An apparatus as recited in claim 9 in which means in said computation means for computing the offset voltage $V_X$ of the computation means comprises:

(a) a first subtraction means for subtracting the second density reference voltage $\tilde{V}_2$ from the first density reference voltage $\tilde{V}_1$;

(b) a second subtraction means for subtracting the second ideal voltage $V_2$ from the first ideal voltage $V_1$;

(c) a third subtraction means for subtracting the highlight voltage $V_H$ from the first ideal voltage $V_1$;

(d) a fourth subtraction means for subtracting the shadow voltage $V_S$ from the first ideal voltage $V_1$;

(e) a first division means for dividing the output of the third subtraction means by the output of the second subtraction means;

(f) a second division means for dividing the output of the fourth subtraction means by the output of the second subtraction means;

(g) a first multiplication means for multiplying the output of the first subtraction means by the output of the first division means;

(h) a second multiplication means for multiplying the output of the first subtraction means by the output of the second division means;

(i) a fifth subtraction means for subtracting the output of the first multiplication means from the first density reference voltage $\tilde{V}_1$;

(j) a sixth subtraction means for subtracting the output of the second multiplication means from the first density reference voltage $\tilde{V}_1$;

(k) a third multiplication means for multiplying the output of the fifth subtraction means by the inverse of the second ideal voltage $V_2$;

(l) a fourth multiplication means for multiplying the output of the sixth subtraction means by the first ideal voltage $V_1$;

(m) a seventh subtraction means for subtracting the output of the third multiplication means from the output of the fourth multiplication means; and (n) a third division means for dividing the output of the seventh subtraction means by the output of the second subtraction means.

22. An apparatus as recited in claim 20 in which each said subtraction means comprises:

(a) an inverter for inverting a voltage corresponding to the subtrahend of an equation input thereto; and (b) an adder for adding a voltage corresponding to the minuend of said equation to the output of said inverter.

23. An apparatus as recited in claim 21 in which at least one of said subtraction means comprises:

(a) an inverter for inverting a voltage corresponding to the subtrahend of an equation input thereto; and (b) an adder for adding a voltage corresponding to the minuend of said equation to the output of said inverter.

24. An apparatus as recited in claim 8 in which the first density reference voltage $\tilde{V}_1$ is a white reference voltage $\tilde{V}_{max}$ corresponding to white (0% halftone dot density), the second density reference voltage $\tilde{V}_2$ is a black reference voltage $\tilde{V}_{min}$ corresponding to black (100% halftone dot density), the first ideal voltage $V_1$ is an ideal white voltage $V_{max}$ corresponding to white, and the second ideal voltage $V_2$ is an ideal black voltage $V_{min}$ corresponding to black.

25. An apparatus as defined in claim 12 in which the first density reference voltage $\tilde{V}_1$ is a white reference voltage $\tilde{V}_{max}$ corresponding to white (0% halftone dot density), the second density reference voltage $\tilde{V}_2$ is a black reference voltage $\tilde{V}_{min}$ corresponding to black (100% halftone dot density), the first ideal voltage $V_1$ is an ideal white voltage $V_{max}$ corresponding to white, and the second ideal voltage $V_2$ is an ideal black voltage $V_{min}$ corresponding to black.

26. An apparatus as defined in claim 13 in which the first density reference voltage $V_1$ is a white reference voltage $V_{max}$ corresponding to white (0% halftone dot density), the second density reference voltage $V_2$ is a black reference voltage $V_{min}$ corresponding to black (100% halftone dot density), the first ideal voltage $V_1$ is an ideal white voltage $V_{max}$ corresponding to white, and the second ideal voltage $V_2$ is an ideal black voltage $V_{min}$ corresponding to black.

27. An apparatus as recited in claim 24 in which the ideal white voltage assumes a specific value $V_B$; the ideal black voltage assumes zero; and means in said computation means for computing the gain $V_\gamma$ of the amplifier comprises a subtraction means for subtracting the black reference voltage from the white reference voltage, a memory means for storing the specific value $V_B$ and a division means for dividing the specific value $V_B$ by the output of the said subtraction means; and the output of the second memory is used as an offset value of the amplifier.

28. An apparatus as recited in claim 25 in which the ideal white voltage assumes a specific value $V_B$; the ideal black voltage assumes zero; and means in said computation means for computing the gain $V_\gamma$ of the amplifier comprises a subtraction means for subtracting the black reference voltage from the white reference voltage, a memory means for storing the specific value $V_B$ and a division means for dividing the specific value $V_B$ by the output of the said subtraction means; and the output of the second memory is used as an offset value of the amplifier.

29. An apparatus as recited in claim 26 in which the ideal white voltage assumes a specific value $V_B$; the ideal black voltage assumes zero; and the gain $V_\gamma$ of the amplifier comprises a subtraction means for subtracting the black reference voltage from the white reference voltage, a memory means for storing the specific value $V_B$ and a division means for dividing the specific value $V_B$ by the output of said subtraction means; and the output of the second memory is used as an offset value of the amplifier.

* * * * *